June 17, 1969 R. GREINER 3,450,095
APPARATUS FOR THE THREE-DIMENSIONAL DECORATION OF
PIECES OF CANDY PARTICULARLY PRALINES
Filed Sept. 2, 1966 Sheet 1 of 2
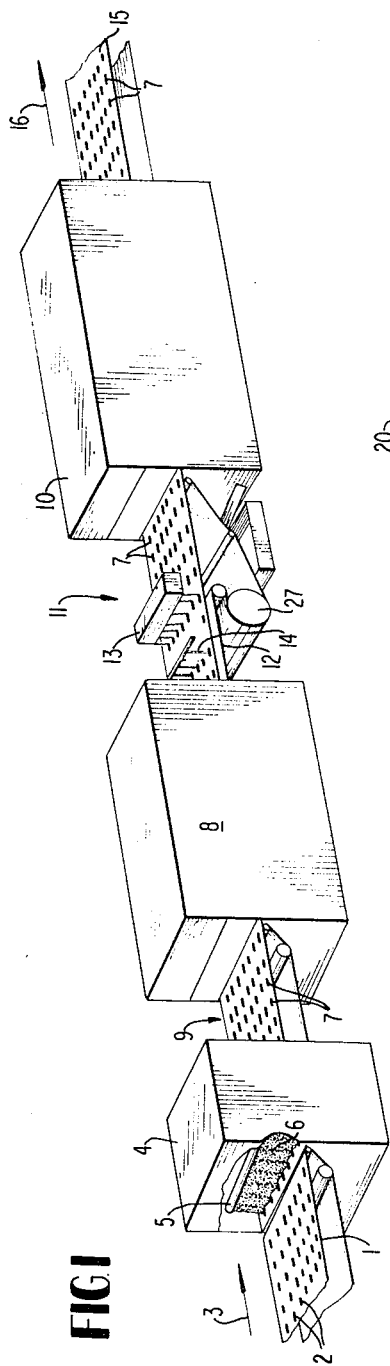
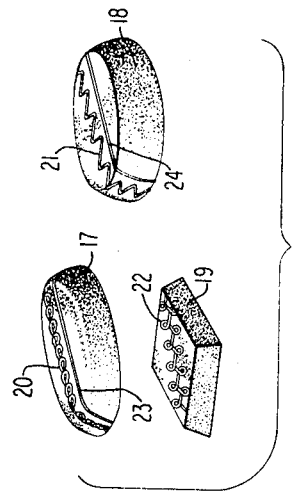
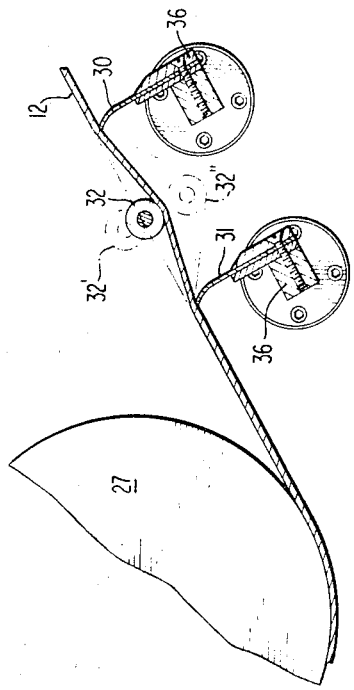
INVENTOR.
ROLF GREINER
BY
Craig & Antonelli
ATTORNEYS June 17, 1969 R. GREINER 3,450,095
APPARATUS FOR THE THREE-DIMENSIONAL DECORATION OF
PIECES OF CANDY PARTICULARLY PRALINES
Filed Sept. 2, 1966 Sheet 2 of 2

United States Patent Office 3,450,095
Patented June 17, 1969

3,450,095
APPARATUS FOR THE THREE-DIMENSIONAL DECORATION OF PIECES OF CANDY PARTICULARLY PRALINES
Rolf Greiner, Stuttgart-Vaihingen, Germany, assignor to Winkler & Dunnebier Maschinenfabrik und Eisengiesserei, Neuwied (Rhine), Germany
Filed Sept. 2, 1966, Ser. No. 577,030
Claims priority, application Germany, Sept. 2, 1965, Sch 37,657
Int. Cl. B05c 5/00, 11/14; A23g 3/20
U.S. Cl. 118—14          7 Claims

ABSTRACT OF THE DISCLOSURE

Apparatus for the three-dimensional decoration of pieces of candy, such as pralines, wherein the pieces of candy are conveyed on a continuous conveyor through a station wherein they are coated by a molten mass of chocolate deposited from nozzles or the like, then passed through a precooling station and cooled down to a point where the outer skin of the coating begins to solidify, then immediately they are conveyed past a decorating station where a decorative coating is applied, and finally they are cooled to room temperature in a further cooling station. The apparatus of the present invention includes scrapers brought into contact with the conveyor belt in the region of the decorating station to clean the excess decorating material from the conveyor belt.

---

The present invention relates to an apparatus for the three-dimensional decoration of pieces of candy, particularly pralines, which pieces of candy are covered, in a coating device, with a coating mass and are then subjected to a cooling process in order to harden the mass. More particularly, the present invention relates to the above process and apparatus wherein the coated candy is pre-cooled before the decoration is applied, and thereafter, the coated and decorated candy is finally cooled.

The conventional automatic decorating of pralines in a continuous process is conducted in coating devices, shortly after the pralines have been covered by the coating mass, with the aid of suitable decorating means. The coating mass on the pralines is still soft and fluid when the decorating takes place; thus the decoration enters into an intimate bond with the decorating mass, which is applied onto the coating mass by means of machines. In this manner, the automatically applied decorations adhere well to the pralines. After this decorating step, the pralines pass through a cooling stage where the decorating and coating masses cool and harden. Simultaneously with the hardening process, the pralines also receive a gloss on their surfaces advantageously enhancing their appearance.

This known automatic decorating process has the disadvantage that the decorations do not stand out from the surface of the pralines in a three-dimensional manner as much as pralines that have been individually decorated by hand. Decorations of a different color than the coating mass still contrast decoratively from the surface of the pralines to a certain degree, but decorations of the same color have only the appearance of a wave type of decoration that is produced, for example, by means of a blower on the liquid coating mass. For this reason, it has been the preferred practice to predominantly hand-decorate the better grade pralines; however, the production of such hand-decorated pralines is considerably more expensive than the production of automatically decorated pralines.

The present invention has an object to provide a process and an apparatus which avoid the disadvantages of the conventional automatic decorating process and make it possible to produce decorated pralines by machine so that the decorated pralines closely resemble manually decorated pralines. More specifically, it is object of the present invention to provide a process and apparatus to pre-cool coated candies before applying decorations and subsequently finally cool them.

The present invention relates to the discovery that the disadvantages of the prior art decorating procedure and apparatus result from the fact that the decorative mass sinks into the still fluid coating mass to thus greatly diminish or destroy the three-dimensional effect of the coating. The process of this invention solves this problem by interrupting the cooling process with the decorating process, i.e., subjecting the covered pralines before they are decorated, to a precooling step and then, after they are decorated, to a final cooling step. In this manner, it is possible to prevent the decorating mass from sinking into the still warm and fluid coating mass. In this connection, the precooling of the pralines is particularly advantageously conducted until the bottom of the pralines is firm and the remaining coating mass has a hardened outer film. It has been discovered that pralines produced in accordance with this novel process and apparatus fulfill all expectations with respect to looks and similarly with hand-decorated pralines. Furthermore, it was proven that the adherence of these decorations, applied by machine in accordance with the novel process, to the already hardened coating mass is satisfactory, and that, further, the gloss on the coating mass and on the decorative mass is not impaired by the novel process and apparatus.

Advantageously, the pralines produced by the present invention may be aligned on a conveying device after the precooling step and before the decorating step, thereby insuring that all decorations are accurately applied to the bodies of the pralines that may have become misaligned during coating. By the process of this invention, there can thus be eliminated a disadvantage inherent in the prior art automatic praline decorating process and apparatus. The pralines are aligned before they are covered with the coating mass; during the coating process, they are very often displaced from their aligned position, so that in the subsequent decorating step the decorations in the conventional prior art process will be misaligned on the pralines. Previously, to the present invention, a repeated aligning of the pralines has not been possible after the coating and before the decorating, because the still fluid coating mass did not permit the contacting of the pralines with aligning devices, for example. By means of the pre-cooling step of the present invention, the pralines are provided with a firm outer skin before they are decorated, so that they can be aligned before the decorating step.

The apparatus for conducting the process of the present invention is advantageously provided with a cooling channel or housing that has a conveying device; this channel being subdivided by an intermediate section into two portions, the first of which serves for precooling and the second of which serves for the final cooling of the pralines; the intermediate section is provided with a decorating device and a conveying device. Advantageously, the intermediate section can additionally be provided with a device for aligning the pralines on the conveying device, such aligning device being suitably a rake provided with polytetrafluoroethylene rails or the like. The conveying device pertaining to the intermediate section can be particularly advantageously a conveyor belt whose surface is cleansed after the decorating process of residual decorating mass by means of a cleaning device. Thereby, the already hardened bottom of the pralines is not damaged. The cleaning device can preferably be a stripping device which is pressed against the surface of the belt. Such stripping device can consist of a band tension roller and two scraping knives, and the belt is pressed against these knives by the tension roller. In an advantageous embodiment, there is the further provision that collecting vessels are arranged underneath the scrapping knives, for receiving the stripped-off decorating mass, thus making it possible to re-use the scraped-off decorating mass. Particularly advantageously, two adjacent collecting vessels are provided, each of which has a width of half the breadth of the conveyor belt; this makes it possible, for example, to decorate the pralines lying on the intermediate section with differently colored decorative masses without excluding the decorative mass from re-use by having it mixed with a differently colored decorative mass or with a decorating mass having a different composition.

Further objects, features and details of the invention can be seen from the following embodiment of a device for conducting the process of this invention, which is described with reference to the drawing, wherein:

FIGURE 1 shows a schematic view of a praline coating apparatus with an automatic decorating device, operating in accordance with the process of this invention;

FIGURE 2 illustrates a few embodiments of pralines automatically decorated according to the novel process and apparatus;

FIGURE 5 shows a partial view of the stripping device provided according to the invention for cleaning the decorating mass from the conveyor belt.

Figure 3:
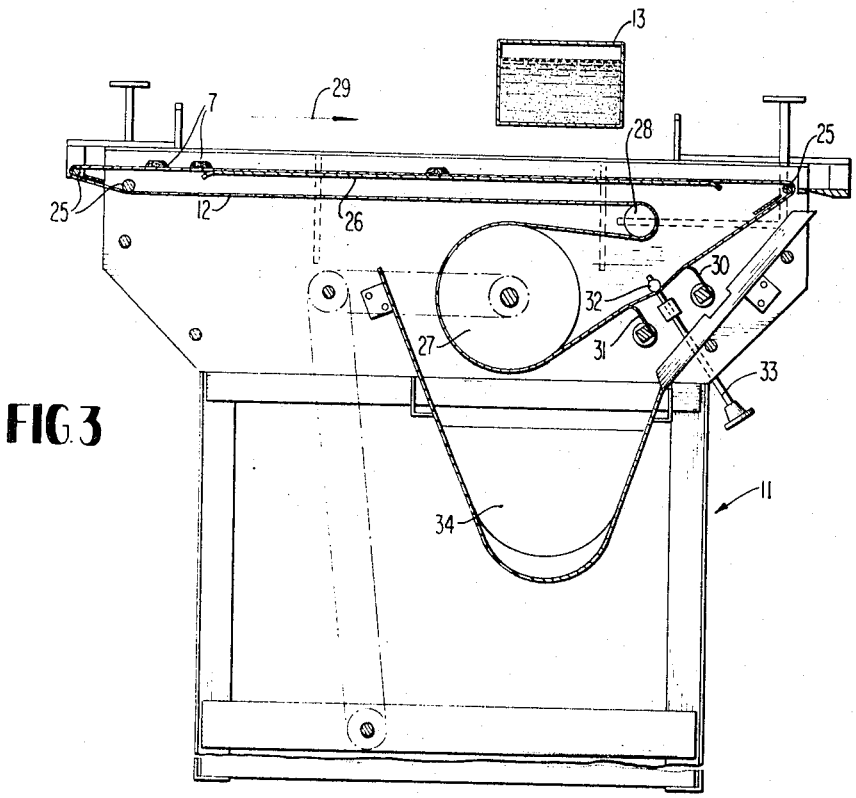
FIGURE 3 shows a longitudinal section through the intermediate section that is inserted into the cooling stage according to this invention.

In FIGURE 1, edible cores or preferably praline cores 2, without any chocolate coating, are conducted in alignment on a conveyor belt 1, in the direction of the arrow 3 to a praline coating device 4. The praline cores 2 consist, for example, of a nut mass without a chocolate coating thereon, but with a bottom which has previously been dipped in a chocolate mass. In the coating device 4, the praline cores are passed underneath one or several tubes 5, from which tubes the coating mass for coating the cores flows downwardly in a broad, controlled curtain 6. During passage through this curtain 6 of heated coating mass, the cores 2 are flooded and coated across their entire surface with the coating mass. During this coating procedure, the praline cores 2 are conveyed on a grid-type belt, so that the coating mass flowing from the tube 5 but not adhering to the praline cores can flow downwardly through this grid and can subsequently be re-used. The praline cores 2 emerge from the coating device 4 as coated pralines 7. After leaving the coating device 4, the coated pralines 7 have a coating mass that is still warm and fluid. In this condition, the praline pieces 7 are conducted into a pre-cooling channel or device 8, where the coating mass is cooled and hardened.

In the previously used automatic decorating processes, it was customary to conduct the decorating step in the section 9 between the coating device 4 and the cooling channel 8 to obtain an intimate bond between the decorating mass and the fluid warm coating mass (reference to the present drawing being made only for purposes of illustration, since the prior art devices are constructed differently). This old decorating process was conducted on top of a grid belt so that the decorating mass that was not applied to the pralines could flow downwardly and be re-used. Such a conveyance of the pralines on a grid belt could not cause any damage to the bottoms of the pralines, because the bottom was not entirely hardened and thus assumed its final shape only upon cooling on a flat belt in the cooling channel.

According to the present invention, the prior art cooling channel is effectively divided into two sections 8 and 10, the cooling channel sections 8 and 10 being connected with each other by an intermediate section 11. This intermediate section 11 consists essentially of a rotating belt 12 for conveying the pralines 7 that have been precooled in the first cooling channel section 8 and toward the second cooling channel section 10, underneath a decorating device 13. This decorating device 13 deposits appropriate ornaments on the surface of the pralines in the form of a decorating mass generally exiting from fine nozzles and flowing downwardly. Before the pralines 7 are passed underneath the individual nozzles of the decorating device 13, the pralines are accurately aligned by a rake or alignment device 14 to avoid rejects caused by unevenly applied decorations. Such an aligning step with the aid of a rake 14 is possible because the cooling of the pralines 7 in the first cooling channel 8 is conducted to a point where the bottom of the pralines is firm (in contrast to being soft in the prior art) and the coating mass has also started to solidify, forming a thin hard skin (in contrast to the soft warm fluid in the prior art). This aligning step is important because the cores 2, although having been aligned before entering the coating device 4, can be displaced from their aligned position when passing through the liquid coating mass curtain 6 within the coating device 4.

Subsequently to the decorating on the intermediate section 11, the pralines 7 travel into the second cooling channel section 10 where they are subjected to a final cooling step and leave the cooling channel section 10 as finished products on a conveyor belt 15 in the direction of the arrow 16.

In FIGURE 2, a number of decorations are illustrated which can be automatically produced by the present invention. These decorations are produced by passing each praline, as mentioned above, on the conveyor belt 12 of the intermediate section 11, underneath one of the nozzles of the decorating device 13 to receive a thin thread of heated decorative mass. The decorative mass is brought to the appropriate operating temperature in a separate container, which is not shown in FIGURE 1. Each nozzle of the decorating device 13 is mounted on a guide rail, which has loop-shaped, zig-zag shaped, or circular-arc shaped movements by means of an appropriate drive gear (not shown). In this manner, the traces 20, 21 and 22, illustrated in FIGURE 2 are produced on the surface of the pralines 17, 18 and 19, respectively, while being moved underneath the nozzles. If the drive of the decorating device is deactivated and thus the discharge nozzles of the decorating device are stationary, it is possible to apply to the pralines (17, 18) also straight linear decorations 23 or 24. Moreover, it is likewise possible to provide, behind the decorating device 13, a rake-like device provided with so-called manipulating wires, i.e., with bent wire ends which are arranged in such as manner that they touch the surface of the decorated pralines and distort the applied decoration in a desired manner. In this way, very decorative effects can be accomplished with the pralines.

From FIGURE 3, it can be seen that the conveyor belt 12 of the intermediate section 11 is passed, via smaller guide rollers 25 and a belt support 26, to a drive roller 27 and a tension roller 28. The tension roller 28 is held by suitable adjustment means, which are not shown in detail, permitting the adjustment of the tension roller 28 in the horizontal direction for adjusting the tension of the belt 12. On the surface of the conveyor belt 12, the pralines 7 are moved in the direction of the arrow 29 and are passed, during the transporting step, past the aligning rake (not shown), and underneath the decorating device 13.

Since the decorating mass flows continuously out of the decorating device 13 and there is space between the individual parlines to be decorated, a certain proportion of the decorating mass will be deposited on the surface of the belt 12. In order to prevent the pralines coming from the cooling channel 8 from adhering to the residues of the decorating mass that would normally be on the belt 12, and in order to avoid smearing of the surface of the belt, a belt cleansing device is provided. The belt cleansing device has two scraping knives 30 and 31 pressed against the belt 12 by means of a further tension roller 32, which can be adjusted by the hand wheel 33. The decorative mass stripped from the belt 12 by the knives 30 and 31 falls into a collecting vessel 34 provided beneath the scraping device.

Figure 4:
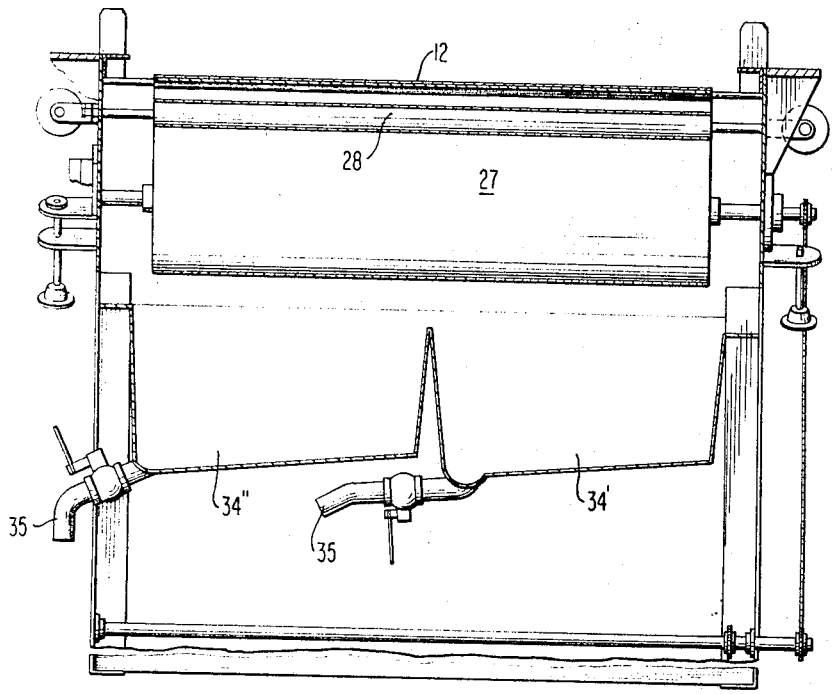
FIGURE 4 shows a cross section through the intermediate section of FIGURE 3, with minor detailed parts not being shown.

As can be seen from FIGURE 4, the collecting vessel 34 may include two collecting troughs 34' and 34" which each have an outlet pipe 35 that can be sealed off. The stripped-off decorating mass can flow through these pipes to a tempering device (not shown) where it is heated and recycled to the decorating device 13. The use of two collecting troughs 34' and 34" has the advantage that it is possible, for example, to decorate the pralines on the right-hand half of the belt 12 with a brown decorative mass, while the pralines on the left-hand side of the belt 12 can be provided with a white decorative mass. Thus, it is possible to decorate two different types of pralines at the same time, or by connecting two intermediate sections 11 one behind the other, to provide one type of pralines with different decorations.

The scraping knives 30 and 31 are, as illustrated in FIGURE 5, exchangeably mounted in suitably constructed holders 36. The tension roller 32 can be moved to and from between the two positions 32' and 32", shown in dot-dash lines, so that, as desired, a greater or lesser contact pressure of the belt 12 with the knives 30 and 31 may be obtained.

By means of the above-described apparatus and the method as disclosed herein, there is provided the possibility to give automatically produced and decorated pralines an appearance that has previously been attainable only by manual production.

The above embodiments have been shown and described only as examples of the present invention; other modifications and embodiments according to the broad aspects of the invention are contemplated within the spirit and scope of the present invention as defined by the following claims.

I claim:
1. An apparatus for coating and three-dimensionally decorating candy comprising:
   means for coating candy cores with a soft coating mass;
   means in one section for precooling the coated candy;
   means in an intermediate section for three-dimensionally decorating the coated candy with a decorating mass;
   means in another section for finally cooling the coated, precooled, decorated candy;
   conveyor means for moving the coated, precooled candy from said precooling means, past said decorating means and to said final cooling means, said conveyor means including a separate conveyor only for moving the coated, precooled candy past said decorating means, and further including means for aligning the candy on said conveying means in said intermediate section, wherein said aligning means is a rake provided with polytetrafluoroethylene candy-engaging rails.
2. The apparatus according to claim 1, wherein said separate conveyor includes a driven conveyor belt, and including means for cleaning the belt surface, after the decorating step, of residues of the decorating mass.
3. The apparatus according to claim 2, wherein said cleaning means is a stripping means mounted to be tightly pressed against the surface of said belt.
4. The apparatus according to claim 3, wherein said stripping means consists of a belt tension roller and two scraping knives against which the belt is pressed by means of the tension roller.
5. The apparatus according to claim 2, including at least two adjacent transversely positioned collecting vessel means together spanning the full transverse dimension of said conveyor belt for collecting the decorating mass that has been only scraped from the corresponding transverse portion of said conveyor belt so that different types of decorating mass may be used simultaneously and the unused portion collected for recycling without mixing the two types.
6. The apparatus according to claim 2, wherein said cleaning means consists of a belt tension roller and two scraping knives against which the belt is pressed by means of said tension roller.
7. An apparatus for coating and three-dimensionally decorating candy comprising:
   means for coating candy cores with a soft coating mass;
   means in one section for precooling the coated candy;
   means in an intermediate section for three-dimensionally decorating the coated candy with a decorating mass;
   means in another section for finally cooling the coated, precooled, decorated candy;
   conveyor means for moving the coated, precooled candy from said precooling means, past said decorating means and to said final cooling means, said conveyor means including a separate conveyor only for moving the coated, precooled candy past said decorating means, wherein said separate conveyor includes a driven conveyor belt, and including means for cleaning the belt surface, after the decorating step, of residues of the decorating mass, further including at least two adjacent transversely positioned collecting vessel means together spanning the full transverse dimension of said conveyor belt for collecting the decorating mass that has been only scraped from the corresponding transverse portion of said conveyor belt so that different types of decorating mass may be used simultaneously and the unused portion collected for recycling without mixing the two types.

References Cited

UNITED STATES PATENTS

| 1,762,043 | 6/1930  | Ayres.     |          |
| 2,586,684 | 2/1957  | McNamara.  |          |
| 2,915,024 | 12/1959 | Kruger et al. |       |
| 1,166,240 | 12/1915 | Momenee    | 118—69 X |
| 1,223,687 | 4/1917  | Fritz      | 118—20   |
| 3,207,088 | 9/1965  | McDonald   | 107—27 X |

WALTER A. SCHEEL, Primary Examiner.

JOSEPH SHEA, Assistant Examiner.

U.S. Cl. X.R.

118—16, 20, 70